United States Patent [19]

Conley

[11] Patent Number: 4,769,877
[45] Date of Patent: Sep. 13, 1988

[54] GRIPPER WITH INNERLOCK

[76] Inventor: John L. Conley, 3870 Chino Ave., Chino, Calif. 91710

[21] Appl. No.: 863,456

[22] Filed: May 15, 1986

[51] Int. Cl.$^4$ .......................................... A44B 21/00
[52] U.S. Cl. ...................................... 24/462; 24/460; 160/392; 160/395; 52/222
[58] Field of Search .................... 24/460, 462; 160/391–395; 52/63, 127.5, 222

[56] References Cited

U.S. PATENT DOCUMENTS

| | | | |
|---|---|---|---|
| 3,426,412 | 2/1969 | Streng et al. | 24/462 X |
| 4,103,401 | 8/1978 | Conley | 24/462 |
| 4,267,876 | 5/1981 | Bloomfield | 160/392 |
| 4,472,862 | 9/1984 | Bloomfield et al. | 24/460 |
| 4,473,982 | 10/1984 | Monari | 160/395 X |
| 4,532,744 | 8/1985 | Beneze et al. | 52/222 |
| 4,562,634 | 1/1986 | Watts | 24/462 X |
| 4,566,236 | 1/1986 | Pound | 24/460 X |

FOREIGN PATENT DOCUMENTS 805953  6/1951  Fed. Rep. of Germany ........ 24/460

Primary Examiner—Francis K. Zugel
Assistant Examiner—Laurie K. Cranmer
Attorney, Agent, or Firm—Boniard I. Brown

[57] ABSTRACT

A sheet gripping assembly for gripping either single ply or double ply thin pliable sheet material such as plastic film. The gripping assembly has a mating channel to be secured to a support with the sheet material spanning the open channel side, and a channel-shaped cap which snaps over the base channel to grip the sheet material between the channel and cap in such a way that edgewise tension in the sheet material tending to separate the cap from the base channel urges their sheet gripping edges into more firm sheet gripping relation, thereby to more firmly grip the sheet material. The primary application of the invention is securing plastic film to an open frame structure to form a greenhouse enclosure.

6 Claims, 1 Drawing Sheet

GRIPPER WITH INNERLOCK

BACKGROUND OF THE INVENTION

1. Field of the Invention

This invention relates generally to the attachment of thin pliable sheet material, such as plastic film, to a support, such as an enclosure frame work. More particularly, the invention relates to an improved sheet gripping assembly for this purpose and which is capable of securing either single sheet or dual sheet material.

2. Prior Art

As will appear from the later description, the improved sheet gripping assembly of the invention is capable of diverse sheet gripping applications involving a variety of thin pliable sheet materials. However, the gripping assembly is intended primarily for use in the construction of greenhouses of the class which comprise plastic film or other thin sheet material covering and supported by an open frame structure. The invention will be described in connection with this particular application.

The type of greenhouse referred to has an open frame structure constructed from pipes, tubes or other similar frame members. Covering and secured to this frame structure are plastic sheets or films which form a weather and wind resistant covering or skin transparent to the sun's ultra-violet radiation.

One essential requirement of such a greenhouse construction is firm but releasable attachment of the plastic film to the frame structure, such that the film will remain firmly in place under relatively high winds and yet may be quickly and easily replaced when necessary. A variety of sheet attachment devices have been devised for this purpose. One widely used type of attachment device is a sheet gripping assembly having a channel-like base to be firmly attached to the greenhouse frame structure and a removable sheet gripping member insertable laterally into the channel of the base through an open side of the channel. In use, the sheet gripping member is removed and the plastic film is placed across the open side of the base and then pushed through its open side into the channel to form a fold in the channel. The gripping member is then inserted through the open side of the channel to a position within this fold wherein the plastic film is firmly gripped between the base and gripping member.

Examples of this type of sheet gripping assembly are described in my prior U.S. Pat. No. 4,103,401 issued Aug. 1, 1978 and in my pending applications Ser. No. 06/462,468 filed Jan. 31, 1983 and Ser. No. 06/738,276 filed May 28, 1985.

Another general type of sheet gripping assembly for greenhouse constructions of the kind described has a base channel to be secured to the greenhouse frame structure and a channel shaped cap which snaps over the base channel. The plastic film to be secured is placed over the base channel after which the cap is pressed onto the base channel to firmly grip the film between the base channel and cap. One existing sheet gripping assembly of this kind is the sheet gripping assembly marketed under the trade name AGRA LOCK. Another similar sheet gripping assembly is that marketed under the trade name KWIK-LOC and described in U.S. Pat. No. 4,231,141. The present invention relates to this type of sheet gripping assembly and overcomes certain deficiencies of the existing gripping assemblies. These deficiencies reside in their tendency to weaken their grip on or release the sheet material when the latter is stressed in edgewise tension due to wind loads and thermal expansion of the air between the two sheets of two-ply material. At least one existing gripping assembly has an upwardly opening trough-like formation which is prone to be filled-up with dirt, leaves, and other debris.

SUMMARY OF THE INVENTION

The present improved sheet gripping assembly has a base channel to be secured to a support, such as the frame structure of a greenhouse of the kind described earlier, and a channel-shaped cap which snaps over the base channel to grip sheet material between the cap and base. The base channel has a web which seats against and is bolted or otherwise firmly attached to the support. Along the longitudinal edges of this web are upstanding edge walls. One edge wall has an inwardly bowed, longitudinal portion forming a longitudinal depression in the outer side of the wall. The other edge wall has an outturned longitudinal edge portion which preferably curls outwardly.

The cap is also essentially a channel having a web and longitudinal edge walls projecting beyond one side of the web. One of these cap edge walls has an inwardly bowed, longitudinal portion. The other edge wall has an inturned longitudinal edge portion which preferably curls inwardly.

The cap is sized to fit over the base channel in a sheet gripping position wherein the cap edge walls straddle the base channel edge walls. In this sheet gripping position, the inwardly bowed portion of the bowed cap edge wall seats or nests within the outer depression in the bowed base channel edge wall. The other inturned cap edge wall engages under the outturned edge portion of the other base edge wall in a manner such that edgewise tension in the sheet material tending to separate the cap from the base channel urges the adjacent cap and base channel edge walls into more firm sheet gripping relation to more firmly grip the sheet material.

According to a preferred feature of the invention, the cap has a longitudinal flange between its edge walls which projects into and depresses the sheet material into the open side of the base channel when the latter and cap are assembled in sheet gripping relation.

Another preferred feature of the invention resides in auxiliary sheet gripping means within the base channel for gripping one-ply of two-ply sheet material to facilitate attachment of the latter to the sheet gripping assembly. This auxiliary sheet gripping means comprises spaced longitudinal gripping walls on the web of the base channel and an auxiliary sheet gripping cap which snaps over the gripping walls in sheet gripping relation to the walls to grip a sheet ply between the walls and cap. In the disclosed embodiment, the base channel is secured to its support by mounting bolts which extend through holes in the base channel web between the auxiliary sheet gripping walls. These walls engage the bolt head flats to restrain the mounting bolts against turning when nuts are threaded on the bolts to fasten the base channel to a support.

AGRA LOCK GRIPPER

Figure 1:
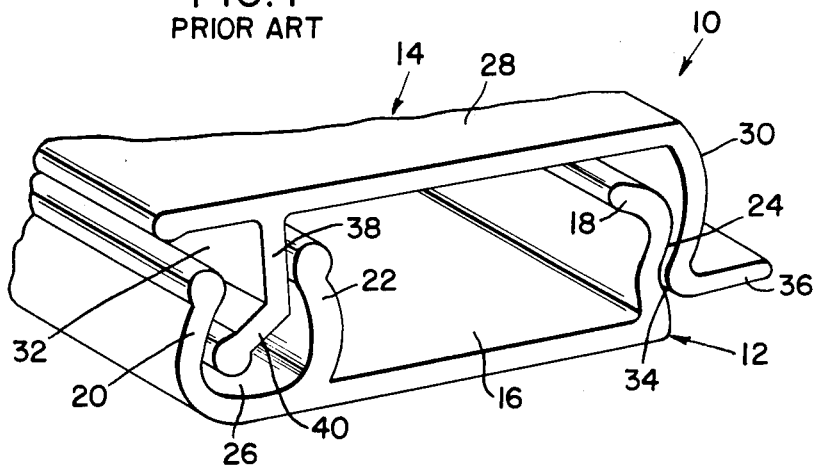
FIG. 1 is a fragmentary perspective view of the prior art AGRA LOCK sheet gripping assembly mentioned earlier.

Turning first to FIG. 1 of the drawings, the illustrated prior art AGRA LOCK sheet gripping assembly 10 has a base channel 12 to be secured to a support and a cap 14 which fits over the base to gripping sheet material between the cap and base channel. The base channel 12 has a web 16 with upstanding edge walls 18 and 20 and an upstanding longitudinal flange 22 between the edge walls and adjacent the edge wall 20.

Base channel edge wall 18 is inwardly bowed to form a longitudinal concave depression 24 in its outer side. The edge wall 20 and flange 22 curl toward one another to form a longitudinal trough 26 therebetween.

The cap 14 has a web 28 and a longitudinal edge wall 30 along one longitudinal edge of the web. Adjacent the other longitudinal edge of the web 28 is a wall 32. Cap edge wall 30 is inwardly bowed at 34 and has an outwardly projecting longitudinal lip 36. Cap edge wall 32 has a planar portion 38 substantially normal to the cap web 28 and an outturned edge portion 40.

Figure 2:
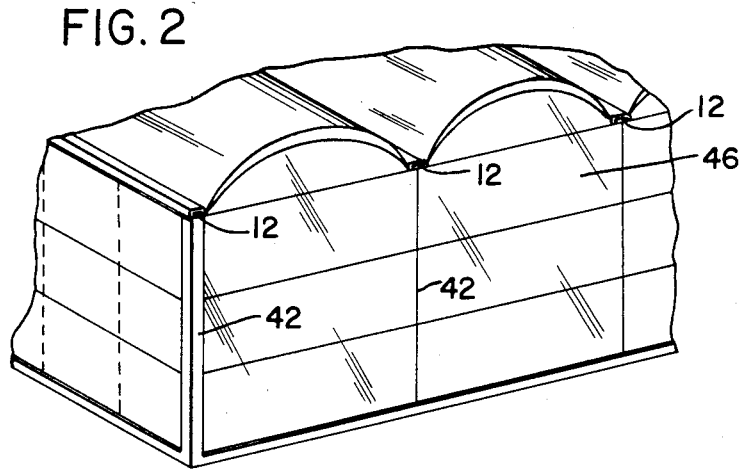
FIG. 2 is a fragmentary perspective view of a greenhouse of the kind with which this invention is concerned.

In use, the base channel 12 is secured to a support, such as a frame member 42 of the greenhouse 44 in FIG. 2. Sheet material to be gripped such as the plastic film 46 covering the greenhouse, is stretched across the open side of the channel. The cap 14 is then pressed downwardly over the base channel to the position shown. In this position, the bowed portion 34 of the cap edge wall 30 seats with the depression 24 in the base channel edge wall 18 with sheet material therebetween. The cap edge wall 32 projects into and depresses a fold in the sheet material into the base channel trough 26.

This prior art sheet gripping assembly is designed to grip the sheet material between the edge walls 18, 30 and between the edge wall 32 and flange 22. Tension in the sheet material, however tends to separate the cap 14 from the base channel 12 in such a way as to pull the cap edge wall 32 upwardly in FIG. 1 from the base channel trough 26. This causes the outturned edge portion 40 of the cap wall 32 to engage the inturned edge portion of the base channel wall 20 and thereby produces a rightward camming force on the cap 14 tending to separate the cap and base channel walls 18, 30 and thus relax their grip on the sheet material. Moreover, the base channel trough 26, opening upwardly as it does in many installed positions of the gripping assembly, tends to fill with debris which must be removed to assure proper gripping action of the assembly.

DESCRIPTION OF THE PREFERRED EMBODIMENT

Figure 3:
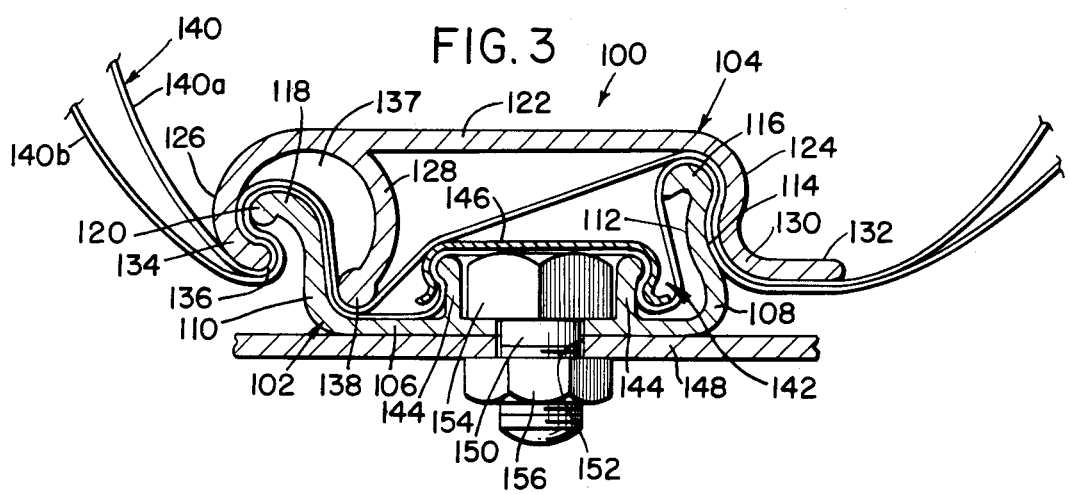
FIG. 3 is a transverse cross-section through a sheet gripping assembly according to the invention showing the assembly attached to a support, such as a frame member of the greenhouse in FIG. 2, and gripping two-ply sheet material, such as plastic film.

The present improved sheet gripping assembly avoids these drawbacks of the AGRA LOCK type sheet gripping assembly. Turning to FIG. 3 of the drawings, the illustrated sheet gripping assembly 100 of the invention has an elongate base channel 102 and an elongate generally channel shaped cap 104.

The base channel 102 has a longitudinal web 106 and upstanding edge walls 108, 110 along the longitudinal edges of the web. Edge wall 108 is inwardly bowed at 112 to form a longitudinal depression 114 in the outer side of the wall. The outer longitudinal edge of the wall 108 is preferably inwardly curled at 116 to form a smooth rounded edge on the wall. Base channel edge wall 110 has an outturned longitudinal edge portion 118 which is preferably curled and terminates along its longitudinal edge in a rounded bead 120, as shown.

The cap 104 of the sheet gripping assembly 100 is generally channel shaped and has a web 122 with projecting edge walls 124, 126 along its longitudinal edges. Between these edge walls is a longitudinal flange 128. Longitudinal edge wall 124 is inwardly bowed at 130 and terminates in an outturned longitudinal lip 132. Edge wall 126 has an inturned longitudinal portion 134 and is preferably inwardly curled as shown. The longitudinal edge of the wall forms a rounded bead 136. The longitudinal cap flange 128 is preferably curled outwardly toward the cap edge wall 126 along its longitudinal edge. This flange projects slightly beyond a plane passing through the cap wall lip 132 and cap wall bead 136 and forms with cap wall 126 a downwardly opening longitudinal channel-like cavity 137.

The base channel 102 and cap 104 are shaped and sized to be assembled in the sheet gripping relation shown in FIG. 3. When thus assembled, the inwardly bowed portion 130 of the cap edge wall 124 engages in the outer longitudinal recess 114 of the bowed base channel wall 112. The inturned longitudinal edge portion 134 of the cap edge wall 126 engages under the outturned longitudinal edge portion 118 of the base channel wall 110. The cap flange 128 projects into the open side of the base channel 102 along the inner side of the base channel wall 110 to a position wherein the longitudinal flange bead 138 enters the juncture between the latter wall and the base channel web 106.

The base channel 102 and cap 104 are sized and provided with sufficient resiliency to snap into and from this assembled relation. The cap and base channel are assembled by first engaging the inturned edge portion 134 of the cap edge wall 126 under the outturned edge portion 118 of the base channel wall 110. Downward pressure is then exerted on the cap lip 132 to snap the inwardly bowed portion 130 of the cap wall 124 over the base channel wall 112 and into the outer depression 114 in the latter wall. The parts are disassembled by reversing this procedure.

The sheet material 140 to be gripped is placed over the open side of the base channel 102 before the cap 104 is assembled on the channel. Subsequent assembly of the cap on the base channel results in gripping of the sheet material between the cap edge wall 124 and channel edge wall 108 and between cap edge 126 and base channel edge wall 110 their edge walls. The cap flange 128 stretches the sheet material downwardly into the base channel and along the inner side of the base channel edge wall 110, as shown. It is apparent that because of the shape of the cap and channel walls, edgewise stress in the sheet material 140 tending to pull up on and thereby separate either longitudinal edge of the cap 104 from the base channel 102 produces a camming force on the cap tending to urge the opposite cap edge wall into more firm sheet gripping relation with the adjacent base channel edge wall. Thus, upward movement of the left-hand edge of the cap 104 in FIG. 2 urges the inner sloping surface of the left-hand cap edge wall portion 134 upwardly against the left-hand base channel edge wall portion 118 to cam the cap to the left and thereby urge the right-hand cap edge wall 124 into more firm sheet gripping relation with the right-hand base channel edge wall 112. Similarly, upward movement of the right-hand edge of the cap in FIG. 3 cams the cap to the right to urge the lefthand cap edge wall 126 into more firm sheet gripping relation with the left-hand base channel edge wall 110.

The present sheet gripping assembly may be used to grip both single ply and double ply sheet material. The particular sheet material illustrated is double ply material having an outer ply 140a and an inner ply 140b. The sheet gripping assembly is provided with auxiliary sheet gripping means 142 for gripping the inner ply 140b of such double ply material while the outer ply is being fixed in position.

Auxiliary sheet gripping means 142 compresses a pair of upstanding longitudinal walls 144 on the base channel web 106 and an elongate auxiliary sheet gripping clip or cap 146 which has a snap fit over the upper edges of the latter walls. To this end, the cap is constructed of spring metal and fits over beaded upper edges of the walls, as shown. When securing two-ply material 140, the inner ply 140b is first secured to the base channel 102 by the auxiliary gripping means. The outer ply 140a is then secured to the base channel by the cap 104. When in place, of course, the cap 104 secures both plys to the base channel.

In the particular sheet gripping assembly shown, the base channel 102 is secured to a support 148, such as a frame member 42 of the greenhouse 44 in FIG. 2, by mounting bolts 150 which extend through holes 152 in the channel web 106 between the auxiliary gripping walls 144. The walls engage the bolt head flats 154 to restrain the bolts against turning during tightening of nuts 156 on the bolts.

The invention claims:

1. A sheet gripping assembly for gripping thin pliable sheet material such as plastic film, comprising:
    an elongate base channel having a web, means for securing said base channel to a support with one side of said web seating against the support, and edge walls along the longitudinal edges of and projecting from the opposite side of said base channel web,
    one base channel edge wall having a longitudinal portion between said web and the longitudinal edge of the wall which bows inwardly laterally of said base channel to form a longitudinal depression in the outer side of the edge wall and said one edge wall having a longitudinal edge portion which curls inwardly laterally of said base channel to form a rounded inturned lip along said wall edge, and the other base channel edge wall having a longitudinal edge portion which curls outwardly laterally of said base channel,
    an elongate channel-shaped cap having a web and longitudinal edge walls projecting from one side of the cap web,
    one cap edge wall having a longitudinal portion which bows inwardly laterally of the cap and the other cap edge wall having a longitudinal edge and curling outwardly laterally of the cap and away from said one cap edge wall and then inwardly laterally of the cap and toward said one cap edge wall from said cap web to said longitudinal edge of said other cap edge wall, whereby said other cap edge wall has an inturned longitudinal free edge portion which projects inwardly laterally of the cap and toward said one cap edge wall,
    said cap being adapted to be assembled in sheet gripping position on said base channel with sheet material disposed between the base channel and cap and with the cap edge walls straddling the base channel edge walls in such a way that said inward bow portion of said one cap edge wall engages in said depression of said one base channel edge wall and said inturned longitudinal free edge portion of said other cap edge wall engages under said outwardly curled edge portion of said other base channel edge wall to grip the sheet material between the base channel and cap edge walls, and
    wherein at least certain of said walls are resiliently flexible to permit said cap to be snapped onto and from said base channel.

2. A sheet gripping assembly for gripping thin pliable sheet material such as plastic film, comprising:
    an elongate base channel having a web, means for securing said base channel to a support with one side of said web seating against the support, and edge walls along the longitudinal edges of and projecting from the opposite side of said base channel web,
    one base channel edge wall having a longitudinal portion between said web and the longitudinal edge of the wall which bows inwardly laterally of said channel to form a longitudinal depression in the outer side of the edge wall and said one edge wall having a longitudinal edge portion which curls inwardly laterally of said base channel to form a rounded inturned lip along said wall edge, and the other base channel edge wall having a longitudinal edge portion which curls outwardly laterally of said base channel,
    an elongate channel-shaped cap having a web and longitudinal edge walls project from one side of the cap web,
    one cap edge wall having a longitudinal portion which bows inwardly laterally of the cap and the other cap edge wall curling inwardly laterally of the cap and terminating in a longitudinal edge,
    said cap being adapted to be assembled in sheet gripping position on said base channel with sheet material disposed between the base channel and cap and with the cap edge walls straddling the base channel edge walls in such a way that said inwardly bowed portion of said one cap edge wall engages in said depression of said one base channel edge wall and said inwardly curled edge of said other cap edge wall engages under said outwardly curled edge portion of said other base channel edge wall to grip the sheet material between the base channel and cap edge walls,
    at least certain of said walls being resiliently flexible to permit said cap to be snapped onto and from said base channel, and
    said cap having an inner longitudinal flange between said cap edge walls for engaging the sheet material between said base channel edge walls when said cap is assembled in sheet gripping position on said base channel.

3. The sheet gripping assembly of claim 2 wherein:
    said flange is situated adjacent and curves toward said other cap edge wall to form with said other cap edge wall a channel-like longitudinal cavity for receiving said other base channel edge wall when said cap is assembled in sheet gripping position on said base channel.

4. A sheet gripping assembly for gripping thin pliable sheet material such as plastic film, comprising:

an elongate base channel having a web, means for securing said base channel to a support with one side of said web seating against the support, and edge walls along the longitudinal edges of and projecting from the opposite side of said base channel web, one base channel edge wall having a longitudinal portion between said web and the longitudinal edge of the wall which bows inwardly laterally of said base channel to form a longitudinal depression in the outer side of the edge wall and said one edge wall having a longitudinal edge portion which curls inwardly laterally of said base channel to form a rounded inturned lip along said wall edge, and the other base channel edge wall having a longitudinal edge portion which curls outwardly laterally of said base channel, an elongate channel-shaped cap having a web and longitudinal edge walls project from one side of the cap web, one cap edge wall having a longitudinal portion which bows inwardly laterally of the cap and the other cap edge wall curling inwardly laterally of the cap and terminating in a longitudinal edge, said cap being adapted to be assembled in sheet gripping position on said base channel with sheet material disposed between the base channel and cap and with the cap edge walls straddling the base channel edge walls in such a way that said inwardly bowed portion of said one cap edge wall engages in said depression of said one base channel edge wall and said edge of said other, inwardly curled cap edge wall engages under said outwardly curled edge portion of said other base channel edge wall to grip the sheet material between the base channel and cap edge walls, at least certain of said walls being resiliently flexible to permit said cap to be snapped onto and from said base channel, and wherein said assembly is adapted to grip two-ply sheet material with one ply of the sheet material situated adjacent said base channel, and said base channel includes auxiliary sheet gripping means on said base channel web between said base channel edge walls for gripping said adjacent ply of the sheet material prior to assembly of said cap on said base channel.

5. The sheet gripping assembly of claim 4 wherein:

said auxiliary sheet gripping means comprises upstanding means on said base channel web and a clip adapted to be assembled over the upstanding means with said adjacent ply disposed between said clip and said upstanding means.

6. The sheet gripping assembly of claim 5 wherein:

said upstanding means comprise spaced longitudinal walls upstanding from said base channel web, and said securing means comprises holes between said upstanding walls for receiving base channel mounting bolts with the bolt head flats engaging the latter walls to restrain the bolts against rotation.

* * * * *